(12) United States Patent
Wahlmann et al.

(10) Patent No.: US 8,326,463 B2
(45) Date of Patent: Dec. 4, 2012

(54) DIGITAL POSITION TRANSMITTER

(75) Inventors: Andreas Wahlmann, Meerbeck (DE); Thomas Kleegrewe, Minden (DE)

(73) Assignee: ABB AG, Mannheim (DE)

( * ) Notice: Subject to any disclaimer, the term of this patent is extended or adjusted under 35 U.S.C. 154(b) by 714 days.

(21) Appl. No.: 12/326,464

(22) Filed: Dec. 2, 2008

(65) Prior Publication Data

US 2009/0149998 A1    Jun. 11, 2009

(30) Foreign Application Priority Data

Dec. 5, 2007 (DE) .................. 10 2007 058 517

(51) Int. Cl.
*G06F 19/00* (2006.01)
(52) U.S. Cl. ........................ 700/275; 701/124
(58) Field of Classification Search ............ 700/275, 700/7, 17, 31, 30, 83, 80; 701/124; 290/40 A; 703/2
See application file for complete search history.

(56) References Cited

U.S. PATENT DOCUMENTS

| | | | | |
|---|---|---|---|---|
| 4,731,996 A * | 3/1988 | Smith et al. | ........................ | 60/390 |
| 5,573,032 A * | 11/1996 | Lenz et al. | ........................ | 137/486 |
| 5,748,469 A * | 5/1998 | Pyotsia | ........................ | 700/30 |
| 5,950,668 A * | 9/1999 | Baumann | ........................ | 137/487.5 |
| 5,966,679 A * | 10/1999 | Snowbarger et al. | ........................ | 702/105 |
| 5,992,229 A * | 11/1999 | Pyotsia et al. | ........................ | 73/168 |
| 6,453,261 B2 * | 9/2002 | Boger et al. | ........................ | 702/138 |
| 6,466,893 B1 * | 10/2002 | Latwesen et al. | ........................ | 702/179 |
| 6,745,084 B2 * | 6/2004 | Boger et al. | ........................ | 700/13 |
| 2001/0035512 A1 * | 11/2001 | Messer et al. | ........................ | 251/129.04 |

OTHER PUBLICATIONS

Fisher, 4200 Series Electronic position Transmitters, Jun. 1997, Fisher-Rosemount p. 1-7.*

Behnk et al., Digital position control for analog servos, Dec. 2006, Humanoid Robots Group, computer Science Institute, p. 56-61.*

* cited by examiner

*Primary Examiner* — Kidest Bahta
(74) *Attorney, Agent, or Firm* — Buchanan Ingersoll & Rooney PC

(57) ABSTRACT

The disclosure relates to a digital position transmitter for control of an actuating element having a positioner in a process installation, with the position transmitter having a regulator with a dead band in order to suppress disturbance signals. It is proposed that the dead band in each case lags the set-value change asymmetrically with respect to the set value.

7 Claims, 2 Drawing Sheets

DIGITAL POSITION TRANSMITTER

RELATED APPLICATION

This application claims priority under 35 U.S.C. §119 to German Patent Application No. DE 10 2007 058 517.0 filed in Germany on Dec. 5, 2007, the entire content of which is hereby incorporated by reference in its entirety.

TECHNICAL FIELD

A digital position transmitter for control of an actuating element is disclosed having a positioner in a process installation.

BACKGROUND INFORMATION

The expression "digital position transmitter" used in this disclosure relates to a system which controls one or more output signals corresponding to a plurality of input signals. Some of the input signals represent a static or dynamic set state while others of the input signals characterize a static or dynamic actual state. The output signals are used to make the actual state match the set state. The algorithm for this purpose is implemented in software in a microcontroller. In general, the output signals—with or without the use of auxiliary power—control the position of an actuating element.

Disturbance variables are superimposed on the input signals. These include the noise of the input signals as well as hysteresis, adhesion resistances and sliding resistances in the actuating elements. These disturbance variables—particularly when the desired position accuracies are high—result in undesirable oscillations of the positioner. These are counteracted by a dead band which suppresses changes in the output signals of the position transmitter as soon as the absolute value of the static or dynamic differences between the set state and the actual state falls below specific limit values. The dead band applies not only to changes in the set value but also to changes in the actual state.

The digital position transmitter comprises a digital regulator which is equipped with a dead band which symmetrically includes the set value. When a digital position transmitter such as this is included in a control loop, it appears for the superordinate control system to be defective when there is no change in the actuating element and thus in the actual state in response to a change, in particular a small change, in the set state. For the control system, a fault is present since the actuating element "does not react". Depending on the safety requirement, this false alarm can lead to the process installation being brought to a safe state, in any case unnecessarily disturbing the technical process.

SUMMARY

The disclosure allows safe process control with a digital position transmitter with input signals with disturbances superimposed on them, and with small set-value changes.

A digital position transmitter is disclosed for control of an actuating element having a positioner, with the position transmitter having a regulator with a dead band in order to suppress disturbance signals, wherein the dead band in each case lags the set-value change asymmetrically with respect to the set value.

In another aspect, an arrangement is disclosed for control of an actuating element having a positioner in a process installation. Such an arrangement comprises a digital position transmitter; a position sensor to signal the travel of a valve rod to the position transmitter; control electronics to compare a detected travel with a set value; an I/P converter of the position transmitter operated by the control electronics for conversion of an electrical control area to an adequate control pressure; and an actuating drive connected to the I/P converter via a pressure medium supply, whereby a regulator results with a dead band to suppress disturbance signals.

BRIEF DESCRIPTION OF THE DRAWINGS

The disclosure will be explained in more detail in the following text with reference to one exemplary embodiment. In the drawings which are required for this purpose.

DETAILED DESCRIPTION

The disclosure is based on the known digital position transmitter whose regulator has a dead band for suppression of disturbance signals.

According to the disclosure, the dead band in each case lags the set-value change asymmetrically with respect to the set value. This means that, as the set values rise, the upper edge of the dead band matches the set value and the lower edge of the dead band is formed by the set value minus the width of the dead band. In the case of falling set values, the lower edge of the dead band matches the set value, and the upper edge of the dead band is formed by the set value plus the width of the dead band.

While maintaining a dead band for disturbance compensation, every set-value change can lead to a change in the position of the actuating element, and thus in a change to the actual state.

As a further measure, which is an improvement to the disclosure, a separate dead band is defined for changes to the set state and is used only to suppress input noise.

Figure 1:
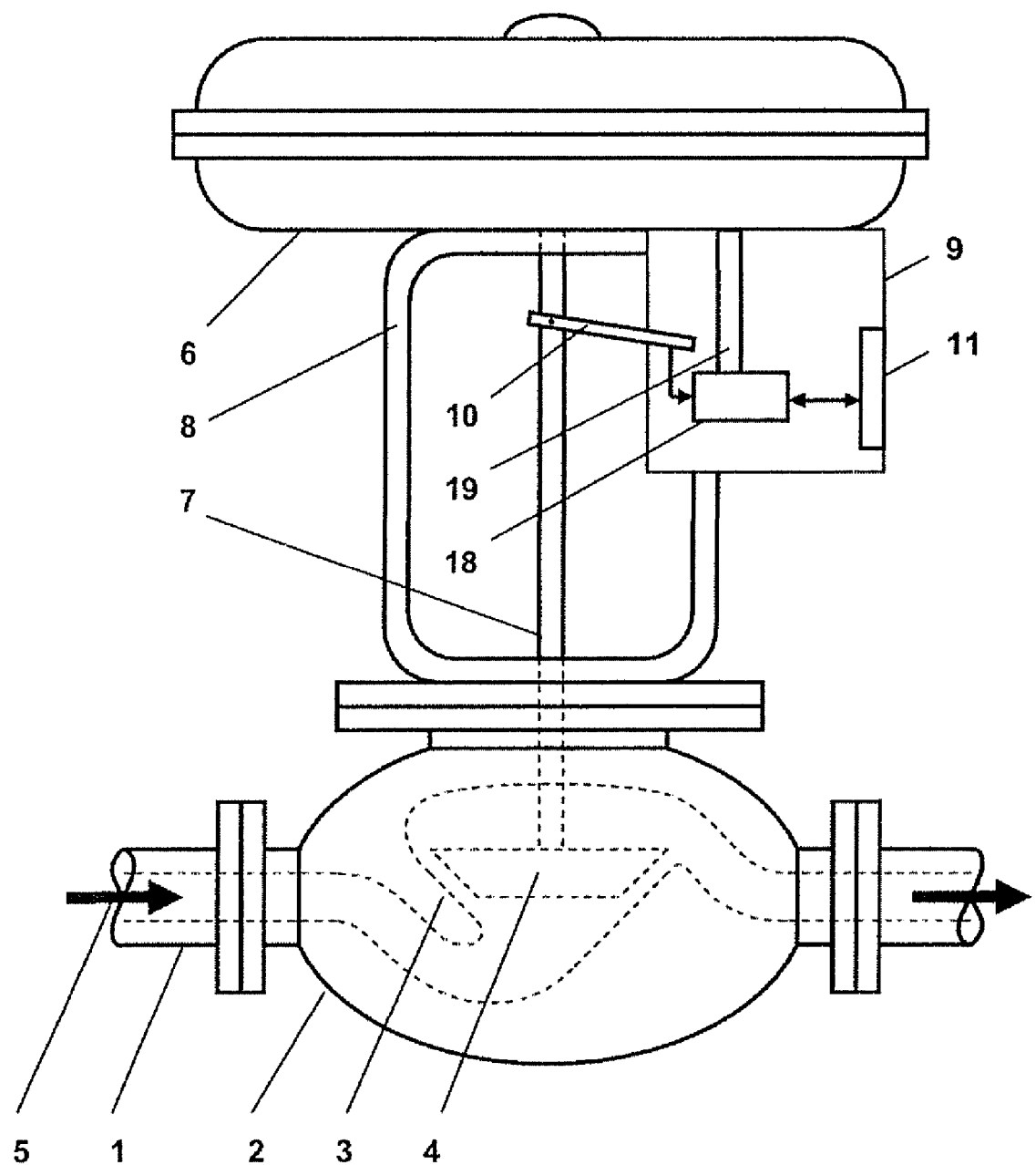
FIG. 1 shows an exemplary outline illustration of an actuating drive, which is operated by a pressure medium, with a digital position regulator.

In FIG. 1, a pipeline 1, a fragment of which is indicated, of a process installation which is not illustrated any further has a process valve 2 installed in it, as an actuating member. In its interior, the process valve 2 has a closure body 4, which interacts with a valve seat 3, in order to control the amount of process medium 5 passing through. The closure body 4 is operated linearly via a valve rod 7 by a pneumatic actuating drive 6. The actuating drive 6 is connected to the process valve 2 via a yoke 8. A digital position transmitter 9 is fitted to the yoke 8. The travel of the valve rod 7 is signaled to the position transmitter 9 via a position sensor 10. The detected travel is compared in the control electronics 18 with the set value supplied via a communication interface 11, and the actuating drive 6 is operated as a function of the determined control error. The control electronics 18 of the position transmitter 9 operate an I/P converter for conversion of an electrical control area to an adequate control pressure. The I/P converter of the position transmitter 9 is connected to the actuating drive 6 via a pressure medium supply 19.

Figure 2:
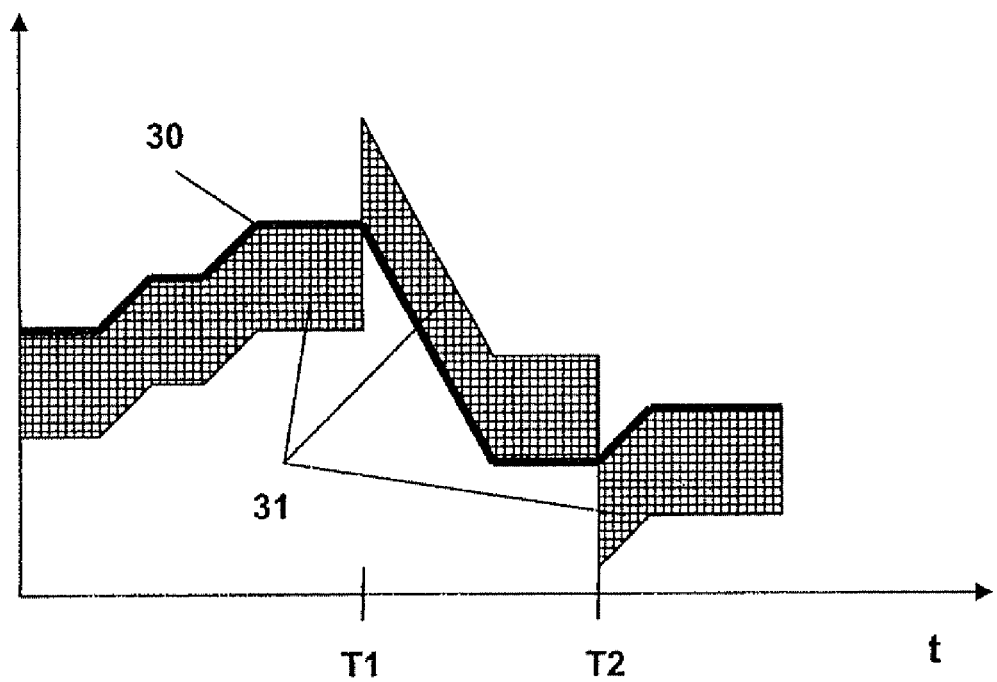
FIG. 2 shows an exemplary time profile of the set value with an associated dead band of the position transmitter according to the disclosure.

FIG. 2 shows an exemplary time profile of the set value 30 and of the associated dead band 31. The dead band 31 in each case asymmetrically lags the change in the set value 30. When the set values 30 are rising, and subsequent to this are constant, the upper edge of the dead band 31 matches the set value 30 for all t<T1 and t>T2. When the set values 30 are falling, and subsequent to this are constant, the lower edge of the dead band 31 matches the set value 30 for all T1<t<T2. The dead band 31 is readjusted when the direction of the set value changes at times T1 and T2.

Figure 3:
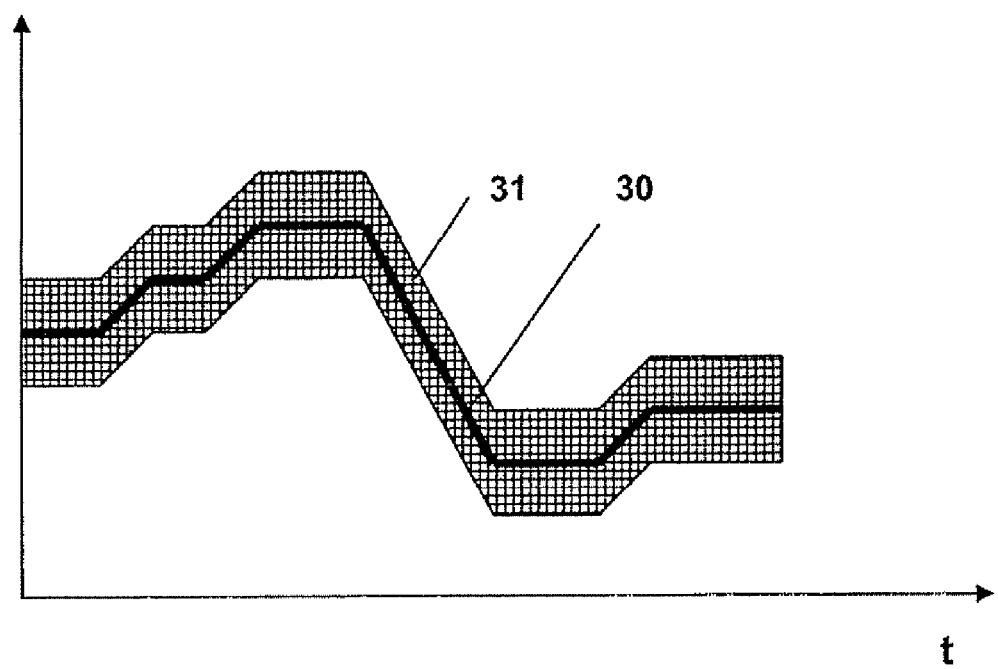
FIG. 3 shows a time profile of the set value with an associated dead band of the known position transmitter.

For comparison, FIG. 3 shows the dead band 31 for the same time profile of the set value 30 with the known position transmitter. The dead band 31 is in each case symmetrical with respect to the set value 30; the set value 30 is in the center of its dead band 31, irrespective of its time profile.

It will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

LIST OF REFERENCE SYMBOLS

1 Pipeline
2 Process valve
3 Valve seat
4 Closure body
5 Process medium
6 Actuating drive
7 Valve rod
8 Yoke
9 Position transmitter
10 Position sensor
11 Communication interface
18 Control electronics
19 Pressure medium supply
30 Set value
31 Dead band

What is claimed is:

1. An arrangement for control of an actuating element having a positioner in a process installation, comprising:
  a digital position transmitter having a regulator;
  a position sensor that signals travel of a valve rod to the position transmitter;
  control electronics that compare detected travel of the valve rod with a set value;
  an I/P converter of the position transmitter operated by the control electronics for conversion of an electrical control error to an adequate control pressure; and
  an actuating drive connected to the I/P converter via a pressure medium supply, wherein the regulator includes a dead band to suppress disturbance signals, the dead band having an upper or lower edge that matches the set value.

2. The arrangement as claimed in claim 1, wherein the digital position transmitter is fitted to a yoke.

3. The arrangement as claimed in claim 1, comprising:
  a communication interface to supply the set value.

4. The arrangement as claimed in claim 1, wherein the actuating drive is operated as a function of a determined control error.

5. The arrangement as claimed in claim 1, wherein the regulator is configured to adjust the dead band when a direction of the set value changes.

6. The position transmitter as claimed in claim 1, wherein a first dead band has an upper edge that matches the set value.

7. The position transmitter as claimed in claim 6, wherein the second dead band has a lower edge that matches the set value.

* * * * *